United States Patent [19]

Inou et al.

[11] Patent Number: 5,729,319
[45] Date of Patent: Mar. 17, 1998

[54] LIQUID CRYSTAL DISPLAY DEVICE AND METHOD FOR FABRICATING THE SAME

[75] Inventors: Ippei Inou, Nara; Yoshihiro Shirai, Yamatokoriyama; Makoto Shiomi, Tenri, all of Japan

[73] Assignee: Sharp Kabushiki Kaisha, Osaka, Japan

[21] Appl. No.: 625,885

[22] Filed: Apr. 1, 1996

[30] Foreign Application Priority Data

Apr. 4, 1995 [JP] Japan ................... 7-079036

[51] Int. Cl.⁶ ................................ G02F 1/1339
[52] U.S. Cl. ................... 349/156; 349/12; 349/188
[58] Field of Search ................... 349/86, 12, 87, 349/188, 92, 93, 155, 158, 183, 187, 189; 428/1; 430/20

[56] References Cited

U.S. PATENT DOCUMENTS

| | | | |
|---|---|---|---|
| 3,861,783 | 1/1975 | Dill et al. | 349/156 |
| 3,863,332 | 2/1975 | Leupp et al. | 349/156 |
| 4,295,712 | 10/1981 | Ishiwatari et al. | 349/156 |
| 5,188,760 | 2/1993 | Hikmet et al. | 252/299.01 |
| 5,194,852 | 3/1993 | More et al. | |
| 5,280,375 | 1/1994 | Tsuda et al. | 349/128 |
| 5,379,139 | 1/1995 | Sato et al. | 349/155 |
| 5,576,866 | 11/1996 | Yamada et al. | 349/155 |
| 5,583,675 | 12/1996 | Yamada et al. | 349/155 |
| 5,612,803 | 3/1997 | Yamada et al. | 349/189 |
| 5,627,665 | 5/1997 | Yamada et al. | 349/94 |

FOREIGN PATENT DOCUMENTS

| | | |
|---|---|---|
| 61-192335 | 11/1986 | Japan. |
| 4-243412 | 8/1992 | Japan. |
| 6-301015 | 10/1994 | Japan. |
| 7-114031 | 5/1995 | Japan. |
| 7-120730 | 5/1995 | Japan. |

*Primary Examiner*—William L. Sikes
*Assistant Examiner*—Tai V. Duong
*Attorney, Agent, or Firm*—Nixon & Vanderhye P.C.

[57] ABSTRACT

A liquid crystal display device includes a pair of substrates opposed to each other, polymeric walls patterned in a predetermined pattern, and a liquid crystal layer at least a part of which is surrounded by the polymeric wall, and the polymeric wall and the liquid crystal layer are interposed between the substrates, wherein the polymeric wall has a predetermined rotatory polarization corresponding to an alignment regulating force of the substrates.

13 Claims, 11 Drawing Sheets

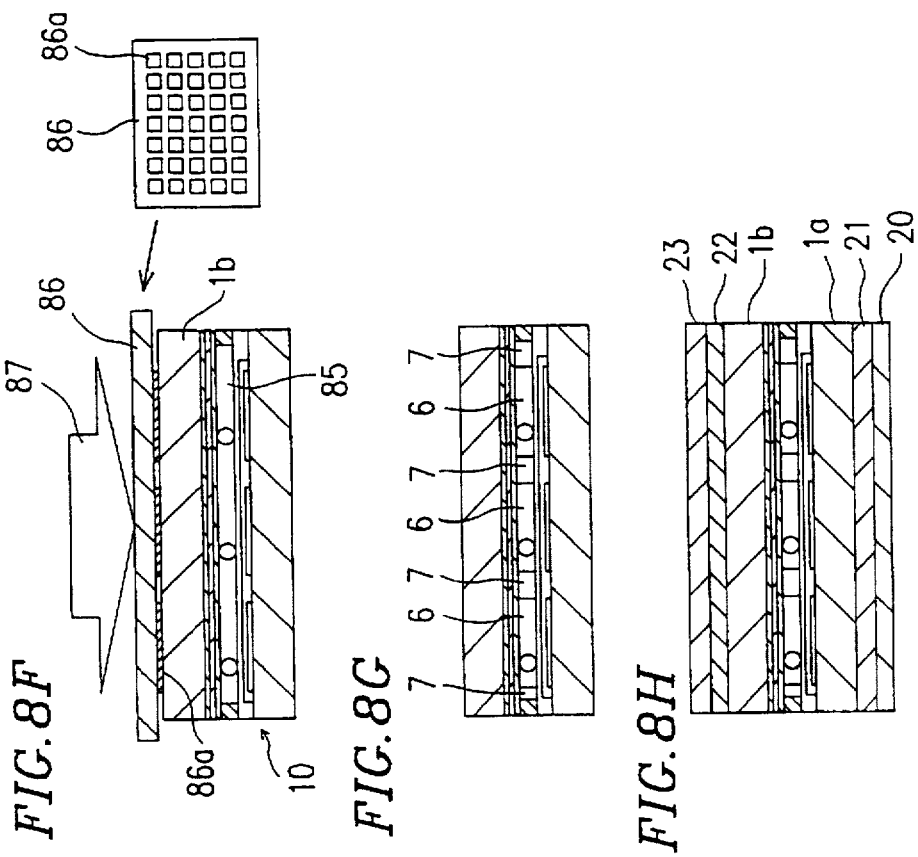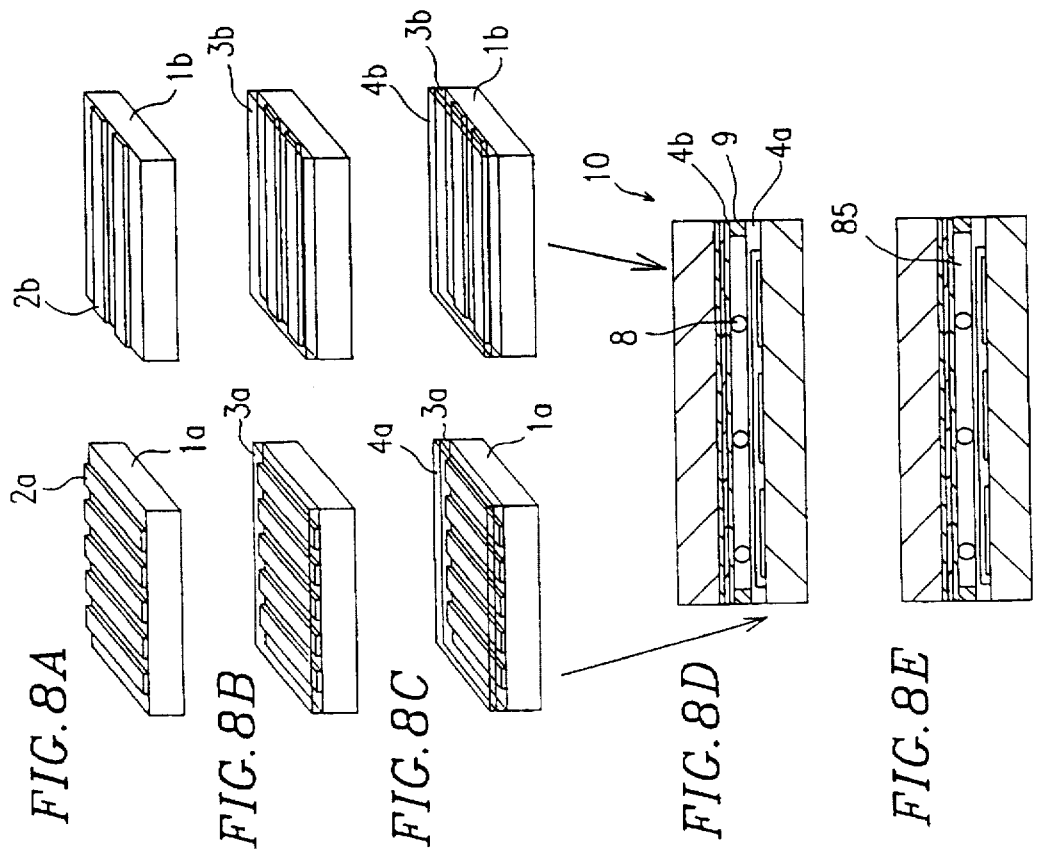

Relationship between angle of light detctor with respect to polarizer and transmittance of light ---- Isotropic polymer ——— Rotatory polarization polymer used in the present invention

1

LIQUID CRYSTAL DISPLAY DEVICE AND METHOD FOR FABRICATING THE SAME

BACKGROUND OF THE INVENTION

1. Field of the Invention

The present invention relates to a liquid crystal display device and a method for fabricating the same. More specifically, the present invention relates to a liquid crystal display device including polymeric walls having a predetermined rotatory polarization corresponding to the alignment regulating force of the substrate, and a liquid crystal layer at least a part of which is surrounded by the polymeric walls; and a method for fabricating the same.

2. Description of the Related Art

Conventionally, liquid crystal display devices have been used for portable information terminals including notebook-type personal computers and word processors, and electronic organizers, as well as electronic desk calculators, by taking advantage of their characteristics such as thinness, lightweight, and low power consumption. In many cases, reflection type liquid crystal display devices are used for these applications.

Generally, brightness and contrast are two of the important factors among the display characteristics of the liquid crystal display devices. The liquid crystal display devices which possess both brightness and contrast are ideal. However, in many cases, brightness is a more important factor for the reflection type liquid crystal display devices, and contrast is a more important factor for the transmission type liquid crystal display devices. Accordingly, in many cases, brightness is the more important factor among the display characteristics of the liquid crystal display devices favorably used for the above-mentioned applications.

Among the above-mentioned devices, the portable information terminals such as the electronic organizers are mainly used to search information which has been already input therein and to output and process such information. For this purpose, there is no need to mount a key board on the portable information terminals in order to input a large amount of document data, but it is sufficient to merely input simple word information such as memo. Accordingly, such portable information terminals do not have a key board. Instead, a pressure-sensing type input device is disposed on the liquid crystal display devices, making it possible to directly input information on the screen. On the other hand, personal computers and word processors are mainly used to input sentences. Therefore, an apparatus of this kind has a key board as an input means. However, in recent years, there has been an increase in the number of occasions for the direct input on the screen of such apparatus, in order to improve the workability such as block definitions. Accordingly, in many cases, word processors and personal computers have a pressure-sensing type input device or an electromagnetic induction type input device in addition to the key board.

For such input devices, the input may be performed by directly pressing the screen with a pen, and the like. A conventional liquid crystal display device includes a liquid crystal layer only sandwiched between the substrates. Therefore, when the input is performed, the substrates are deformed due to the pressure application with a pen or the like, so that the thickness of the liquid crystal layer is changed. As a result, a problem arises in that an uniform display cannot be maintained.

To solve this problem, it has been proposed to fabricate an apparatus having a structure in which a thick Glass of approximately 2 mm with high rigidity is used for the input device disposed on the liquid crystal display device, and spaces are provided between the liquid crystal display device and the input device. However, the apparatus with such a structure has the liquid crystal display portion and the pressure input portion separated from each other, and therefore, a parallax is generated. As a result, it is difficult to perform accurate input onto the liquid crystal display screen. Specifically, the portable information terminals having a function of describing memos, and the like present a serious problem in that there is a gap between the pen tip at the input portion and the liquid crystal display displaying the input marks.

To solve the above-mentioned problems, the Japanese Laid-Open Patent Publication No. 6-301015 proposes a liquid crystal display device having a resistance to pressure capable of resisting deformation caused by the application of pressure, by forming walls made of polymer between the substrates. In this liquid crystal display device, a deformation of the substrates caused by the pressure application can be prevented without providing a thick glass (for example, a glass having a thickness of approximately 2 mm) with high rigidity to the input device. As a result, parallax problems do not arise.

However, the liquid crystal display device described in the Japanese Laid-Open Patent Publication No. 6-301015 has a serious problem in that the entire liquid crystal display device becomes dark because of the polymeric walls formed in the non-pixel portions. This problem is particularly serious in a reflection type liquid crystal display device in a normally white mode which presents a white display with no voltage application.

Accordingly, there is a demand for a liquid crystal display device with high brightness and less parallax, and with excellent resistance to pressure.

SUMMARY OF THE INVENTION

The liquid crystal display device of this invention includes substrates opposed to each other, polymeric walls patterned in a predetermined pattern, and a liquid crystal layer at least a part of which is surrounded by the polymeric wall, and the polymeric wall and the liquid crystal layer are interposed between the substrates, wherein the polymeric wall has a predetermined rotatory polarization corresponding to an alignment regulating force of the substrates.

In another embodiment of the invention, a rotatory polarization monomer forming the polymeric walls includes an alignment regulating portion and a polymerizable portion located on at least one end of the alignment regulating portion.

In another embodiment of the invention, a compound forming the alignment regulating portion is at least one of the compounds selected from the group consisting of cyclopentane, cyclohexane, pyrrole, pyridine, benzene, biphenyl, terphenyl, phenylcyclohexane, anilide benzoate, N-cyclohexylbenzoamide, N-chclohexyl cyclohexanecarboxamide, phenyl benzoate, and phenyl ether.

In still another embodiment of the invention, the polymerizable portion is selected from the group consisting of a vinyl group, a methacrylic group, and an acrylic group.

In still another embodiment of the invention, a compound forming the alignment regulating portion is at least one of the compounds selected from the group consisting of cyclopentane, cyclohexane, pyrrole, pyridine, benzene, biphenyl, terphenyl, phenylcyclohexane, anilide benzoate, N-cyclohexylbenzoamide, N-cyclohexylcyclohexane, phenyl benzoate, and phenyl ether; and the polymerizable portion is selected from the group consisting of a vinyl group, a methacrylic group, and an acrylic group.

In still another embodiment of the invention, the rotatory polarization monomer further comprises a spacer portion between the alignment regulating portion and the polymerizable portion.

In still another embodiment of the invention, a mixture of a liquid crystal material forming the liquid crystal layer and the rotatory polarization monomer has a content of the liquid crystal material equal to an opening ratio of the liquid crystal display device.

In still another embodiment of the invention, a rotatory polarization of the polymeric wall is larger than zero and is equal to or smaller than $\pi/2$(rad).

In still another embodiment of the invention, the liquid crystal display device further includes a pressure-sensing type input device.

A method for fabricating liquid crystal display device comprising substrates opposed to each other, polymeric walls patterned in a predetermined pattern, and a liquid crystal layer at least a part of which is surrounded by the polymeric wall, the polymeric wall and the liquid crystal layer being interposed between the substrates, includes the steps of: injecting a mixture of a rotatory polarization monomer forming polymeric walls and a liquid crystal material forming a liquid crystal layer between the attached substrates so as to obtain a liquid crystal cell; and selectively irradiating a predetermined portion of the liquid crystal cell with ultraviolet rays at a temperature at which the liquid crystal material exhibits an isotropy and an alignment regulating portion of the rotatory polarization monomer is subjected to an alignment regulation of the substrate, thereby polymerizing the rotatory polarization monomer in the predetermined portion so as to form the polymeric walls, and to form a liquid crystal layer in a non-irradiated portion.

In one embodiment of the invention, the irradiated portion corresponds to the non-pixel portion.

In another embodiment of the invention, the means for selectively irradiating the ultraviolet rays is a method using a photomask.

In still another embodiment of the invention, the means for selectively irradiating the ultraviolet rays is a self-alignment method.

In still another embodiment of the invention, a method for fabricating a liquid crystal display device further includes the steps of cooling the liquid crystal cell to a room temperature after irradiation, and irradiating the liquid crystal cell again with ultraviolet rays at room temperature.

Thus, the invention described herein makes possible the advantages of (1) providing a liquid crystal display device having high brightness and excellent resistance to pressure; (2) providing an easy-on-the-eyes liquid crystal display device with less parallax; (3) providing a low-cost liquid crystal display device having the above-mentioned characteristics; and (4) providing a simple method for fabricating such a liquid crystal display device.

These and other advantages of the present invention will become apparent to those skilled in the art upon reading and understanding the following detailed description with reference to the accompanying figures.

BRIEF DESCRIPTION OF THE DRAWINGS

FIGS. 8A to 8H are schematic illustrations showing a preferred example of a method for fabricating a liquid crystal display device of the present invention.

DESCRIPTION OF THE PREFERRED EMBODIMENTS

In the present specification, "a rotatory polarization polymer" means a polymer having a rotatory polarization (that is, the property of rotating the polarizing vibration plane of linearly polarized light). "A rotatory polarization monomer" means a monomer capable of forming a rotatory polarization polymer by polymerization. "An alignment regulating force" means a force capable of aligning molecules of substances existing between substrates (for example, liquid crystal molecules in a liquid crystal layer, polymer molecules of high polymeric walls, and the like) so as to be in a desired state at a desired position. The alignment regulating force can be obtained by performing a surface treatment on the substrates (or alignment films formed on the substrates) in accordance with the desired position and the desired state.

Figure 1:
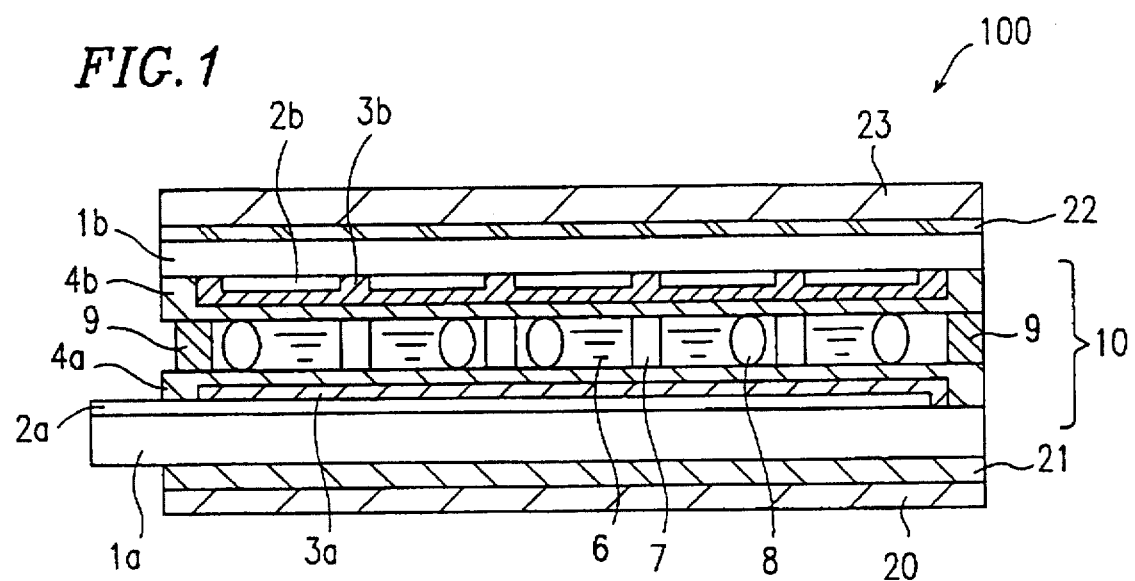
FIG. 1 is a schematic cross-sectional view showing a preferred example of a liquid crystal display device of the present invention.
Figure 2:
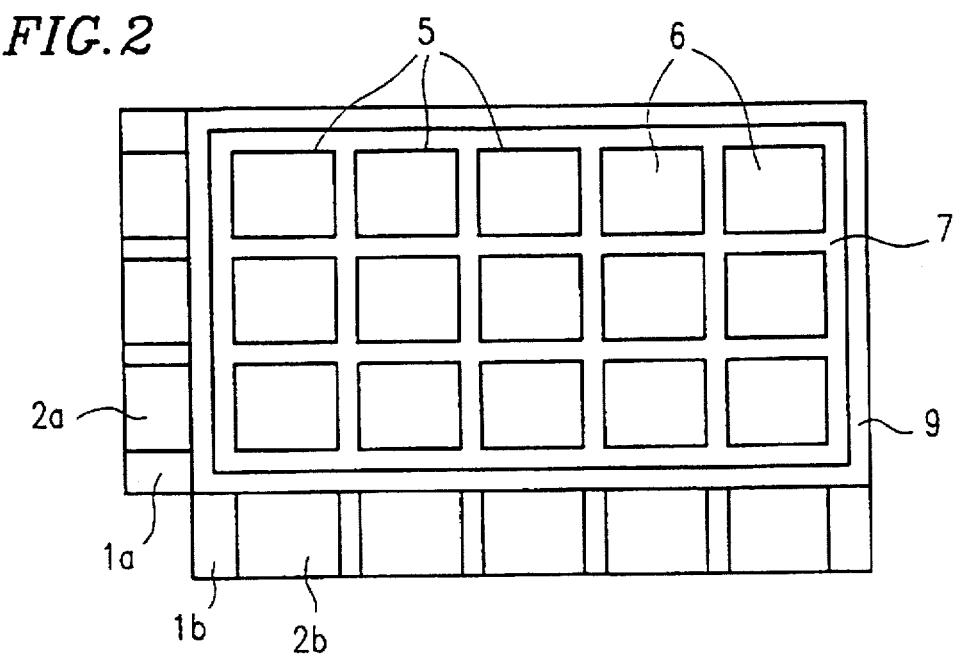
FIG. 2 is a schematic plan view showing a liquid crystal display device shown in FIG. 1.

FIG. 1 is a schematic cross-sectional view showing a preferable example of a liquid crystal display device according to the present invention. FIG. 2 is a schematic plan view showing the liquid crystal display device.. The liquid crystal display device 100 includes: a liquid crystal cell 10; a polarizing plate 21 disposed on the outside of the liquid crystal cell; a reflector 20 disposed on the outside of the polarizing plate 21; a phase difference plate 22 disposed on the other outside of the liquid crystal cell; and a polarizing plate 23 disposed on the outside of the phase difference plate 22. The liquid crystal cell 10 includes a pair of substrates 1a and 1b disposed so as to be opposed to each other. On the substrates 1a and 1b, pixel electrodes 2a and 2b patterned in a predetermined pattern are disposed. The portions where the pixel electrodes 2a and 2b are overlapped are pixel portions 5. If necessary, an electrical insulating films 3a and 3b are provided so as to cover the pixel electrodes 2a and 2b. On the electrical insulating film 3a and 3b, alignment films 4a and 4b are provided. The substrates 1a and 1b sandwich polymeric walls 7 patterned in a predetermined pattern, a liquid crystal layer 6 at least a part of which is surrounded by the polymeric walls 7 and is used as a display medium, and spacers 8. The substrates 1a and 1b are attached to each other by a sealant 9 at a peripheral portion thereof.

The substrates 1a and 1b are made of well-known and rigid materials such as glass and/or plastic. The thickness of the substrates is preferably in a range of about 0.2 to about 2.0 mm. If the thickness is smaller than about 0.2 mm, the processing of the substrates tends to be difficult. If the thickness is larger than about 2.0 mm, surface reflection tends to be generated, and moreover, the liquid crystal display device becomes heavy in weight. Therefore, a thickness larger than about 2.0 mm is not preferable for practical applications.

The pixel electrodes 2a and 2b are made of materials such as ITO (Indium Tin Oxide) and SnO. The pixel electrodes 2a and 2b are formed on the substrates 1a and 1b at a desired thickness by methods such as deposition and sputtering, and patterned in a desired pattern by well-known methods such as etching and photolithography. One example of the process of forming the pixel electrodes 2a and 2b is as follows: First, ITO is deposited so as to form striped electrodes 2a and 2b having a predetermined width at predetermined intervals by etching. The pixel electrodes 2a and 2b are formed so as to intersect at right angles with each other viewed from the direction of a normal axis to the substrates 1a and 1b. The portions where the pixel electrodes 2a and 2b are overlapped work as the pixel portions 5 which contribute to the display. The width of the pixel electrodes is preferably in a range of about 30 to about 400 μm. The interval between the pixel electrodes is preferably in a range of about 10 to about 30 μm. The thickness of the pixel electrodes is preferably in a range of about 300 to about 2000 Å.

The electrical insulating films 3a and 3b are made of well-known materials such as $SiO_2$ and $SiN_x$. The electrical insulating films 3a and 3b are formed in a predetermined thickness by methods such as deposition and sputtering. The thickness of the electrical insulating films 3a and 3b is preferably in a range of about 500 to about 10000 Å.

The alignment films 4a and 4b are made of materials such as polyimide resin and polyamide resin. The alignment films 4a and 4b are formed by methods such as flexography. The thickness of the alignment film is preferably in a range of about 300 to about 1000 Å. Preferably, the alignment film is subjected to an alignment treatment. Typical examples of the alignment treatment include a rubbing method, an oblique deposition method, Langmuir-Blodgett's film method, a stamper method, and the like. For example, the alignment treatment is performed so that the liquid crystal has a desired aligning condition (for example, the twisted nematic (TN) orientation or the supertwisted nematic (STN) orientation under the condition that the stripe shaped pixel electrodes 2a and 2b intersect with each other. Moreover, the alignment treatment is also performed so as to adjust the rotatory polarization of the polymeric walls which will be described later.

The liquid crystal material constituting the liquid crystal layer 6 is an organic mixture which exhibits liquid crystalline behavior in the vicinity of room temperature (usually, 20°–25° C.), and may be selected from the well-known materials. Examples of the liquid crystal include nematic liquid crystal, cholesteric liquid crystal, smetic liquid crystal, a ferroelectric liquid crystal, discotic liquid crystal, and the like. These liquid crystals can be used alone or in combination. The liquid crystal can be driven by any of operation modes such as twisted nematic, supertwisted nematic, electrically controlled birefringence, and ferroelectric which utilize both birefringence and polarization. If necessary, a chiral agent and the like is added to the liquid crystal material.

The polymeric wall 7 has a predetermined rotatory polarization corresponding to the alignment regulating force of the substrate. The polymeric wall 7 is made of the rotatory polarization polymer obtained by polymerization of rotatory polarization monomer. The rotatory polarization monomer and the polymerization thereof will be described below.

Figure 3A:
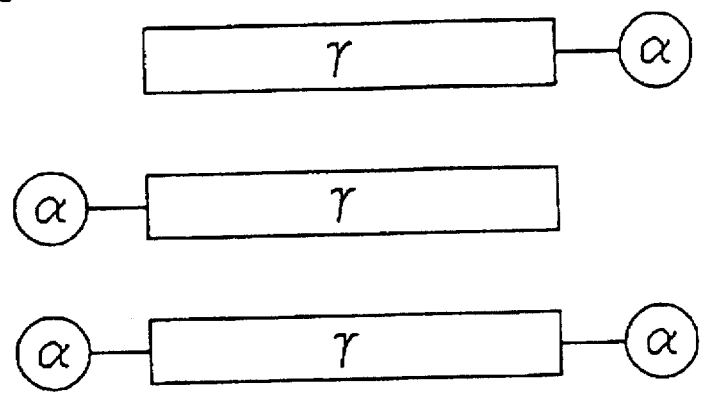
FIGS. 3A and 3B are schematic illustrations showing a rotatory polarization monomer.
Figure 3B:
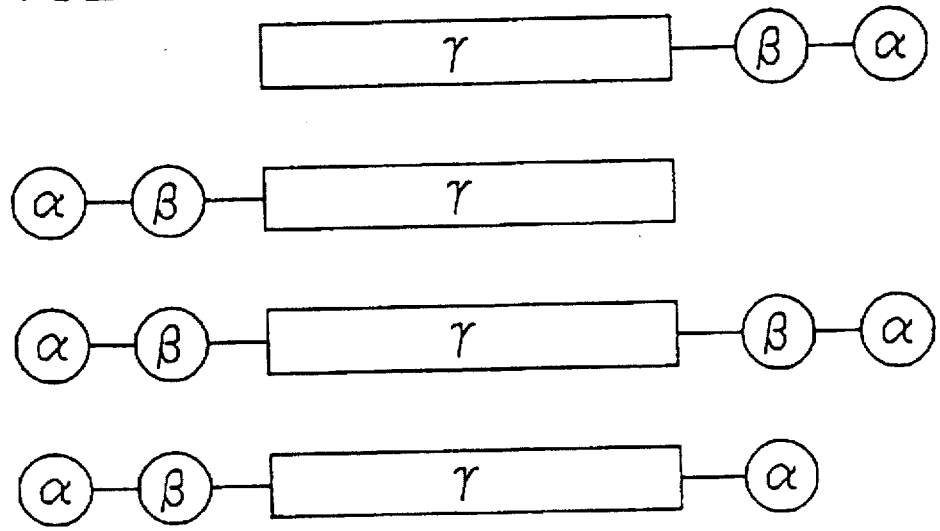

FIGS. 3A and 3B are schematic illustrations showing the rotatory polarization monomer. As shown in FIG. 3A, the rotatory polarization monomer includes an alignment regulating portion γ, a polymerizable portion α disposed at least at one end of the alignment regulating portion γ. Moreover, as shown in FIG. 3B, the rotatory polarization monomer may have a spacer portion β between the alignment regulating portion γ and the polymerizable portion α, if desired or necessary.

Figure 4:
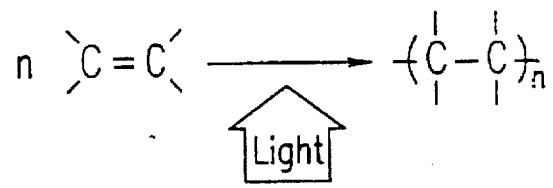
FIG. 4 is a schematic illustration showing a polymerization of the polymerizable portion of the rotatory polarization monomer.

The polymerizable portion α has a chemical structure with a photopolymerizable C=C bond (π bond), as shown in FIG. 4. Typically, the polymerizable portion α is irradiated with light so that a radical is generated from the C=C bond (π bond). As a result, radical addition polymerization can be performed. Examples of such a polymerizable portion include a vinyl group represented by Formula (I), a methacrylic group represented by Formula (II), and an acrylic group represented by Formula (III):

In a preferred embodiment, the polymerizable portion α is an acrylic group, because an acrylic group is more likely to react due to light.

The spacer portion β has a chemical structure allowing the alignment regulating portion γ to be bound to the polymerizable portion α via the spacer portion β itself. Typically, the spacer portion β has a straightchain chemical structure bound via a σ bond. Examples of such a spacer portion β include an alkylene group such as a methylene group represented by Formula (IV), an ether group represented by Formula (V), and a carboxyl group represented by Formula (VI). In a preferred embodiment, the spacer portion β is a methylene group, because a methylene group has a structure with no polarity.

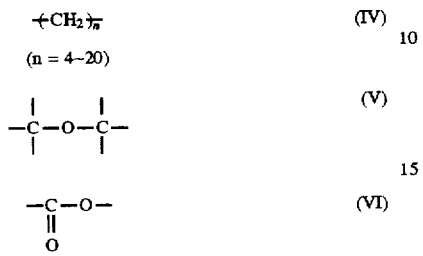

The alignment regulating portion γ has a chemical structure with a rigid cyclic portion. Typical examples of the compound forming such an alignment regulating portion γ include: five or six membered rings of alicyclic hydrocarbons such as cyclopentane represented by Formula (VII) and cyclohexane represented by Formula (VIII); five or six membered rings of nitrogen-containing cyclic hydrocarbons such as pyrrole represented by Formula (IX) and pyridine represented by Formula (X); aromatic hydrocarbons such as benzene represented by Formula (XI); hydrocarbons in which aromatic hydrocarbon is bound via σ bond such as biphenyl represented by Formula (XII) and terphenyl represented by Formula (XIII); hydrocarbons in which alicyclic hydrocarbon and aromatic hydrocarbon are bound to each other via a σ bond such as phenylcyclohexane represented by Formula (XIV); cyclic amides in which the cyclic portions are bound to each other via amide bonds such as anilide benzoate represented by Formula (XV), N-cyclohexylbenzamide represented by Formula (XVI), and N-cyclohexyl cyclohexanecarboxamide represented by Formula (XVII); cyclic esters in which the cyclic portions are bound to each other via an ester bond such as phenyl benzoate (XVIII); cyclic ethers in which the cyclic portions are bound to each other via an ether bond such as phenyl ether represented by Formula (XIX). Moreover, at least a part of hydrogen of the cyclic portion of these chemical structures can be substituted by a halogen such as chlorine and fluorine, or a cyano group. In a preferred embodiment, the compound forming the alignment regulating portion γ is phenylcyclohexane, because phenylcyclohexane has a molecular structure similar to that of liquid crystals, and is likely to be aligned in the same manner as liquid crystal molecules by an alignment film.

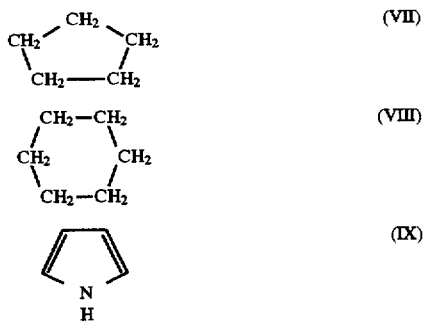

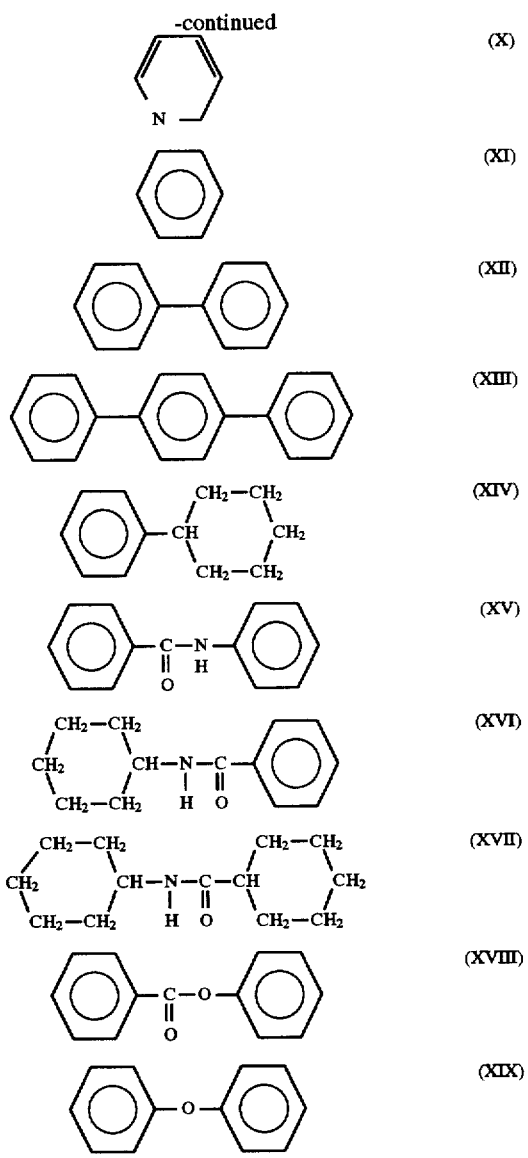

The liquid crystal layer 6 and the polymeric wall 7 are formed by phase separation of a mixture of the liquid crystal material and the rotatory polarization monomer. The phase separation of the liquid crystal material and the rotatory polarization monomer is achieved by the Polymerization of the rotatory polarization monomer. For example, by selectively irradiating an ultraviolet ray to a desired portion of the liquid crystal cell including a mixture of the liquid crystal material and the rotatory polarization monomer between the substrates attached to each other, the rotatory polarization monomer is polymerized in the irradiated portion by action of the ultraviolet rays. As a result, the polymeric wall 7 made of the rotatory polarization polymer is formed in the irradiated portions, and the liquid crystal material gathers in the non-irradiated portions so that the liquid crystal layer 6 is formed. Typically, the ultraviolet ray is irradiated at the non-pixel portions. That is, in a preferred embodiment, the liquid crystal layer is formed in the pixel portions, and the polymeric walls are formed in the non-pixel portions.

It is preferable that the content of the rotatory polarization monomer in the mixture of the liquid crystal material and the rotatory polarization monomer is equal to the opening ratio of the liquid crystal display device. For example, when the width of the pixel electrode is 0.30 mm and the interval between the electrodes is 0.02 mm, the opening ratio of the liquid crystal display device is 87.1%. Accordingly, the mixing ratio of the liquid crystal material and the rotatory polarization monomer is preferably 87.1:12.9. By mixing the liquid crystal material and the rotatory polarization monomer at this ratio, the possibility that the non-polymerized rotatory polarization monomer is retained in the liquid crystal layer is remarkably decreased. As a result, a liquid crystal display device with excellent display characteristics can be obtained.

Preferably, a polymerization initiator is added to the rotatory polarization monomer. By adding the polymerization initiator, the polymerizable portion α can be easily polymerized by irradiation with ultraviolet rays. From 0.1 to 1 parts by weight of the polymerization initiator can be added with respect to 100 parts by weight of the rotatory polarization monomer. Typical examples of the polymerization initiator include azobisisobutyronitrile (AIBN) represented by Formula (XX), 2-dimethoxy-2-phenylacetophenone (for example, Irugacure: product name, fabricated by Ciba-Geigy Ltd.) represented by Formula (XXI):

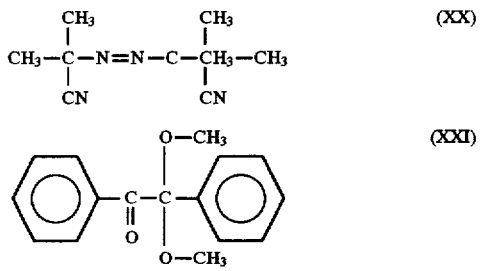

Next, the polymerization of the rotatory polarization monomer will be described. For simplification, only the case of the rotatory polarization monomer having the spacer portion β and the polymerizable portion α at both ends of the alignment regulating portion γ (the third monomer from top in FIG. 3B), and the case of the rotational monomer having the spacer portion β and the polymerizable portion a at one end of the alignment regulating portion γ (the second monomer from top in FIG. 3B) will be described.

Figure 5:
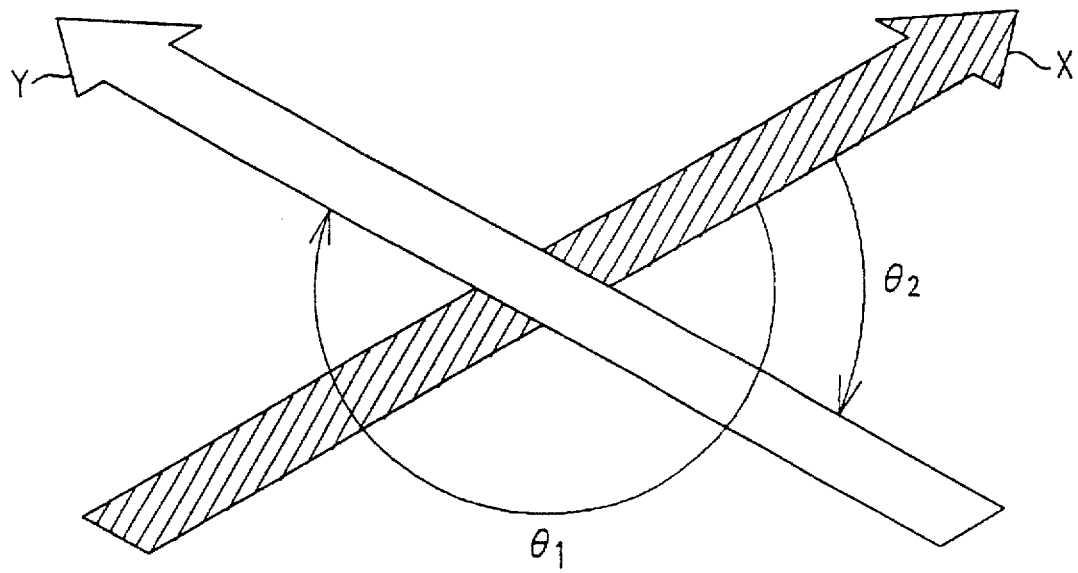
FIG. 5 is a schematic illustration showing the relationship between the alignment treatment direction of an alignment film, and the twisting angle of liquid crystal molecules and the twisting angle of the alignment regulating portion of a rotatory polarization monomer in a liquid crystal display device of the present invention.

The rotatory polarization monomer exists between the alignment films 4a and 4b under the regulation of the alignment films 4a and 4b for which an alignment treatment was performed. That is, the rotatory polymerization monomer exists between the alignment films 4a and 4b under the condition that the alignment regulating portion γ is aligned at a predetermined twist angle in the direction of the thickness of the liquid crystal display device. For example, referring to FIG. 5, when the alignment regulating direction of the alignment film 4a is set to X and the alignment regulating direction of the alignment film 4b is set to Y so that the liquid crystal molecules of the liquid crystal layer 6 are aligned at the twist angle $\theta_1$ in the direction of the thickness of the liquid crystal display device, the alignment regulating portion γ of the rotatory polarization monomer is aligned at the twist angle $\theta_2$ ($\theta_2=\theta_1-\pi$)(rad) in the direction of the thickness of the device. The angle $\theta_2$ shows the rotation angle of the polarizing vibration plane rotated by the rotatory polarization polymer. The angle $\theta_2$ varies depending on the desired alignment state of the liquid crystal, however, it is preferably larger than zero and is π/2 (rad) or less. The twisting direction of the alignment regulating portion γ (that is, the rotation direction of the alignment regulating direction) may be clockwise direction or counterclock wise direction viewed from the direction of a normal axis relative to the substrate.

If the rotatory polarization monomer is irradiated with ultraviolet ray under the state in which the alignment regulating portion γ is aligned in a twist state as described above, as shown in FIGS. 6A and 6B, the polymerizable portions α are polymerized to form a main chain P. As a result, the polymeric wall 7 made of the rotatory polarization polymer can be obtained. As described above, the ultraviolet ray is typically irradiated at the non-pixel portions, so that the rotatory polarization monomer is polymerized only in the non-pixel portions. Accordingly, the polymeric walls 7 are typically formed in the non-pixel portions.

Figure 6A:
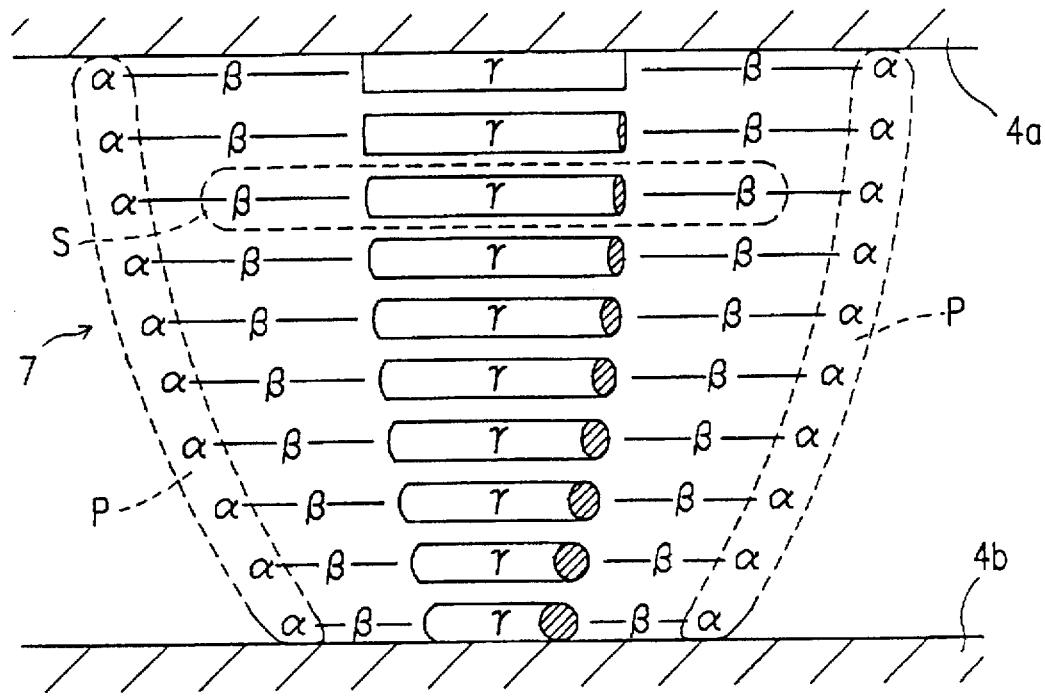
FIGS. 6A and 6B are schematic illustrations showing a molecular structure of the rotatory polarization polymer constituting polymeric walls in a liquid crystal display device of the present invention.
Figure 6B:
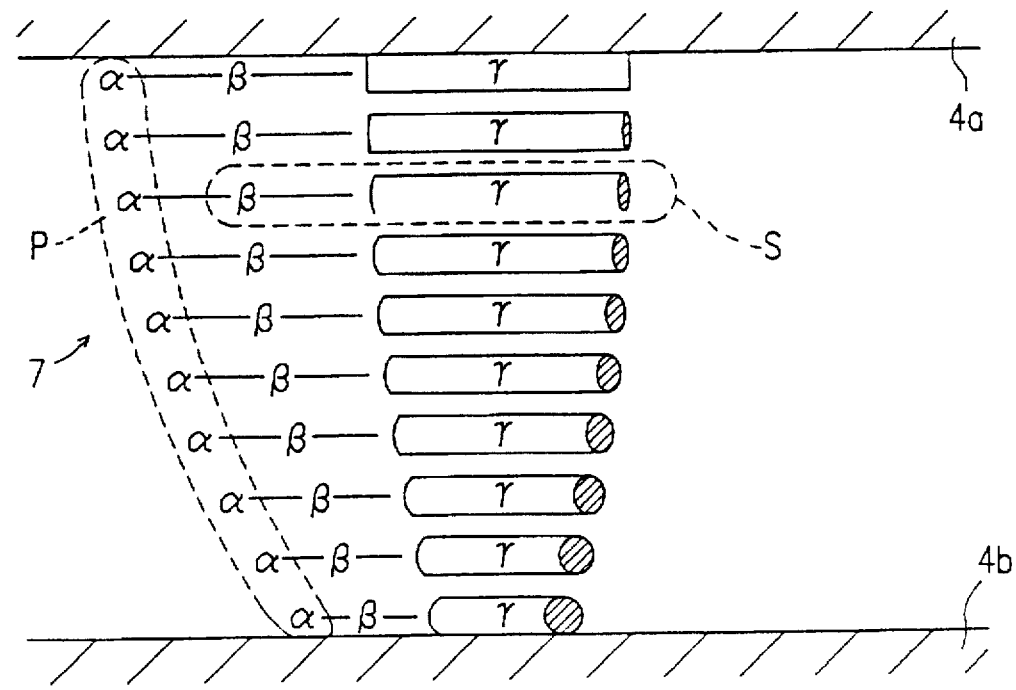

In the case of the rotatory polarization monomer having the polymerizable portions α at both ends thereof, as shown in FIG. 6A, a rotatory polarization polymer having a twisted ladder-shaped molecular structure is obtained. In the case of the rotatory polarization monomer having polymerizable portions α at only one end, as shown in FIG. 6B, a rotatory polarization polymer having a twisted comb-shaped molecular structure is obtained. In both cases, a liquid crystal display device having a high brightness and an excellent resistance to pressure can be obtained. However, a liquid crystal display device having polymeric walls made of the rotatory polarization polymer with a molecular structure such as shown in FIG. 6A has more excellent resistance to pressure. This is because the obtained rotatory polarization polymer has a three-dimensional cross-linked structure in which main chains P are bound to each other via side chains S, so that more rigid polymeric walls are formed.

The polarizing plate 21, the phase difference plate 22, and the reflector 20 are any effectively used polarizing plate, phase difference plate and reflector, and are not specifically limited. For example, a conventional reflector, which is formed by depositing aluminum, silver, and the like onto a substrate, can be used as the reflector 20.

Figure 7:
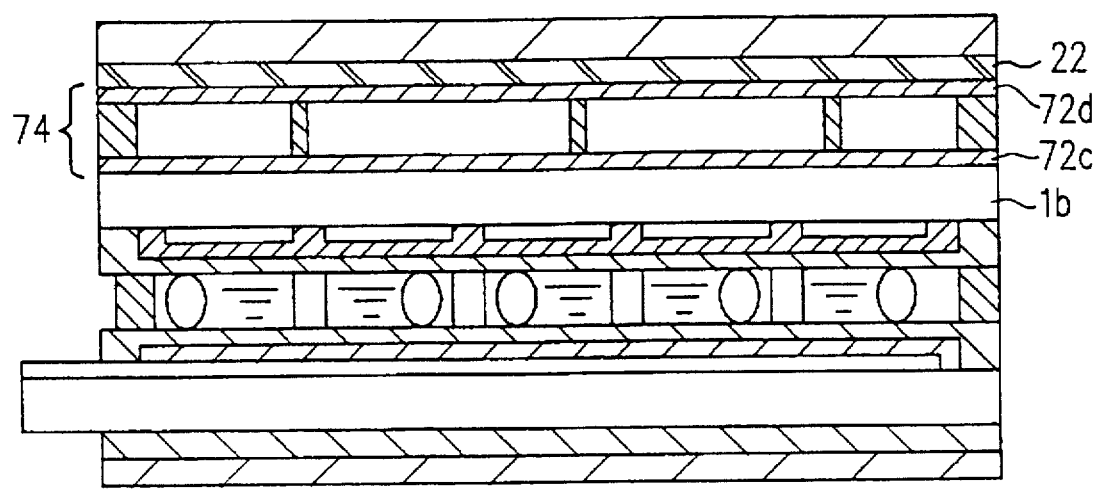
FIG. 7 is a schematic cross-sectional view showing another exemplary liquid crystal display device of the present invention.

In another preferred embodiment, as shown in FIG. 7, the liquid crystal display device 100 of the present invention may further include a pressure-sensing type input device 74 having transparent electrodes 72c and 72d between the substrate 1b and the phase difference plate 22.

Next, a preferred example of a method for fabricating the liquid crystal display device of the present invention will be described, referring to FIGS. 8A to 8H.

First, as shown in FIG. 8A, pixel electrodes 2a and 2b are formed on substrates 1a and 1b at a predetermined width, interval, and thickness, respectively. Next, as shown in FIG. 8B, electrical insulating films 3a and 3b are formed at a predetermined thickness so as to cover the pixel electrodes 2a and 2b. Then, as shown in FIG. 8C, alignment films 4a and 4b are formed at a predetermined thickness so as to cover the electrical insulating films 3a and 3b. The alignment films are subjected to alignment treatment so that the liquid crystal of liquid crystal layer 6 has a desired aligning condition. Then, as shown in FIG. 8D, an appropriate amount of spacer 8 is disposed on the alignment film 4a, so that the substrates 1a and 1b are attached to each other via a sealant 9 in such a manner that the pixel electrodes 2a and 2b intersect at right angles with each other viewed from a direction of a normal axis relative to the substrates 1a and 1b. Furthermore, as shown in FIG. 8E, a mixture 85 of the liquid crystal material and the rotatory polarization monomer is injected in a gap between the attached substrates 1a and 1b by a well-known method. As a result, a liquid crystal cell 10 is obtained.

Figure 9:
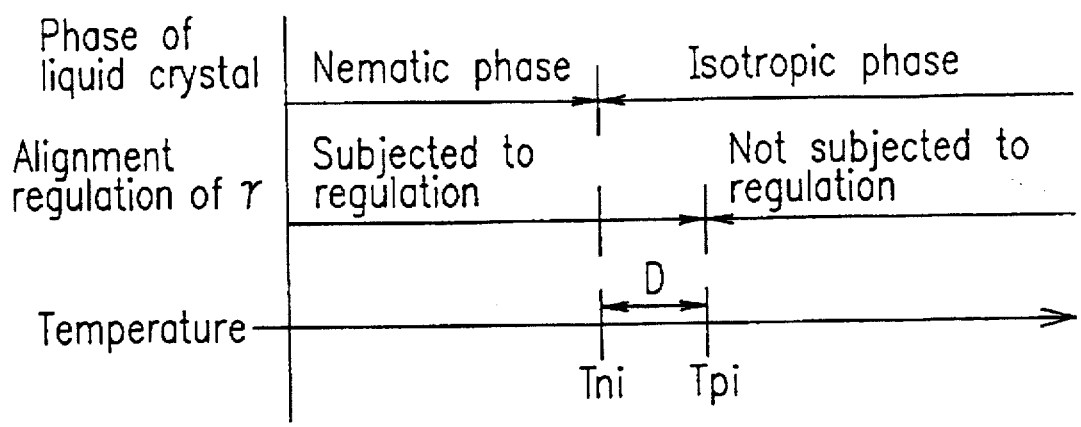
FIG. 9 is a schematic diagram showing a range of temperature in which a liquid crystal material exhibits an isotropic phase and the alignment regulating portion of the rotatory polarization monomer is subjected to the alignment regulation of the alignment film.

The obtained liquid crystal cell 10 is heated to the temperature at which the liquid crystal material exhibits isotropic phase (that is, a temperature equal to or higher than a phase transition temperature (Tni) of the liquid crystal material), and at which the alignment regulating portion γ of the rotatory polarization monomer is not subjected to the alignment regulation of the alignment films 4a and 4b (that is, a temperature equal to or lower than the critical temperature Tpi) (hereinafter, the temperature is referred to as a heating temperature). The heating temperature is defined as a temperature region D between Tni and Tpi, as shown in FIG. 9. The heating temperature can be varied depending on the kinds of the liquid crystal material and the rotatory polarization monomer, the blending ratio of the liquid crystal material and the rotatory polarization monomer, and the kind of the alignment treatment; however, it is preferably in a range of about 70° to about 130° C., and more preferably, in a range of about 80° to about 100° C. For example, in the case where the liquid crystal material is RDP-157 fabricated by Rodick, the Tni is 74° C. In the case where the compound forming the alignment regulating portion γ of the rotatory polarization monomer is anilide benzoate, the Tpi is 130° C. or more. Accordingly, the heating temperature can be selected from the temperatures in a range of about 74° to about 130° C., for example, the temperature of 90° C. can be selected.

While the liquid crystal cell is maintained at the heating temperature, the desired portion of the liquid crystal cell (typically, the non-pixel portions) is irradiated with ultraviolet rays. Methods for selectively irradiating ultraviolet rays include a method using a photomask, a self-alignment method using the pixel electrode itself as a mask, and the like. When a photomask is used, for example as shown in FIG. 8F, a liquid crystal cell 10 is irradiated with an ultraviolet ray 87 via a photomask 86 in which a light blocking portion 86a has a matrix pattern corresponding to the pixels. The intensity of the irradiation is preferably in a range of about 5 to about 12 mW/cm², and the irradiation period is preferably in a range of about 120 to about 240 seconds. When a self-alignment is conducted, for example, it is preferable that the transmittance of the ultraviolet ray (wavelength: 365 nm) at the pixel electrodes 2a and 2b is in a range of about 20 to about 50%, and the transmittance of the ultraviolet ray at the non-pixel portion is twice as large as that at the pixel electrodes 2a and 2b (that is, in a range of about 40 to about 100%).

As described above, by irradiating the liquid crystal cell with an ultraviolet ray at the heating temperature, the polymerizable portion a of the rotatory polarization monomer is addition-polymerized under the state in which the mobility of the molecules of the liquid crystal material and the rotatory polarization monomer is extremely large, as well as the state in which the alignment regulating portion γ of the rotatory polarization monomer is subjected to the alignment regulation of the alignment films. That is, the phase separation between the liquid crystal material and the rotatory polarization polymer made of the rotatory polarization monomer is achieved very easily. Moreover, the polymerizable portion α is polymerized only in the portion irradiated with ultraviolet rays (that is, the portion other than the light blocking portion 86a of the photomask 86). As a result, as shown in FIG. 8G, the polymeric wall 7 made of the rotatory polarization polymer is formed in the portion irradiated with ultraviolet rays, and the liquid crystal material gathers in the non-irradiated portion, so as to form the liquid crystal layer 6.

Preferably, the irradiated liquid crystal cell is gradually cooled to room temperature (approximately 25° C.), then the liquid crystal cell is irradiated with ultraviolet rays again at room temperature, so that the remaining polymerizable portion α is substantially completely polymerized. In this manner, it is possible to obtain the liquid crystal layer and the polymeric walls with the liquid crystal material and the rotatory polarization polymer excellently phase-separated from each other.

Finally, as shown in FIG. 8H, a polarizing plate 21 having a reflector 20 is laminated to the outside of the substrate 1a in such a manner that the reflector 20 is located at the outside, and the phase difference plate 22 and the polarizing plate 23 are laminated to the outside of the substrate 1b in this order. As a result, the liquid crystal display device 100 can be obtained.

Figure 10:
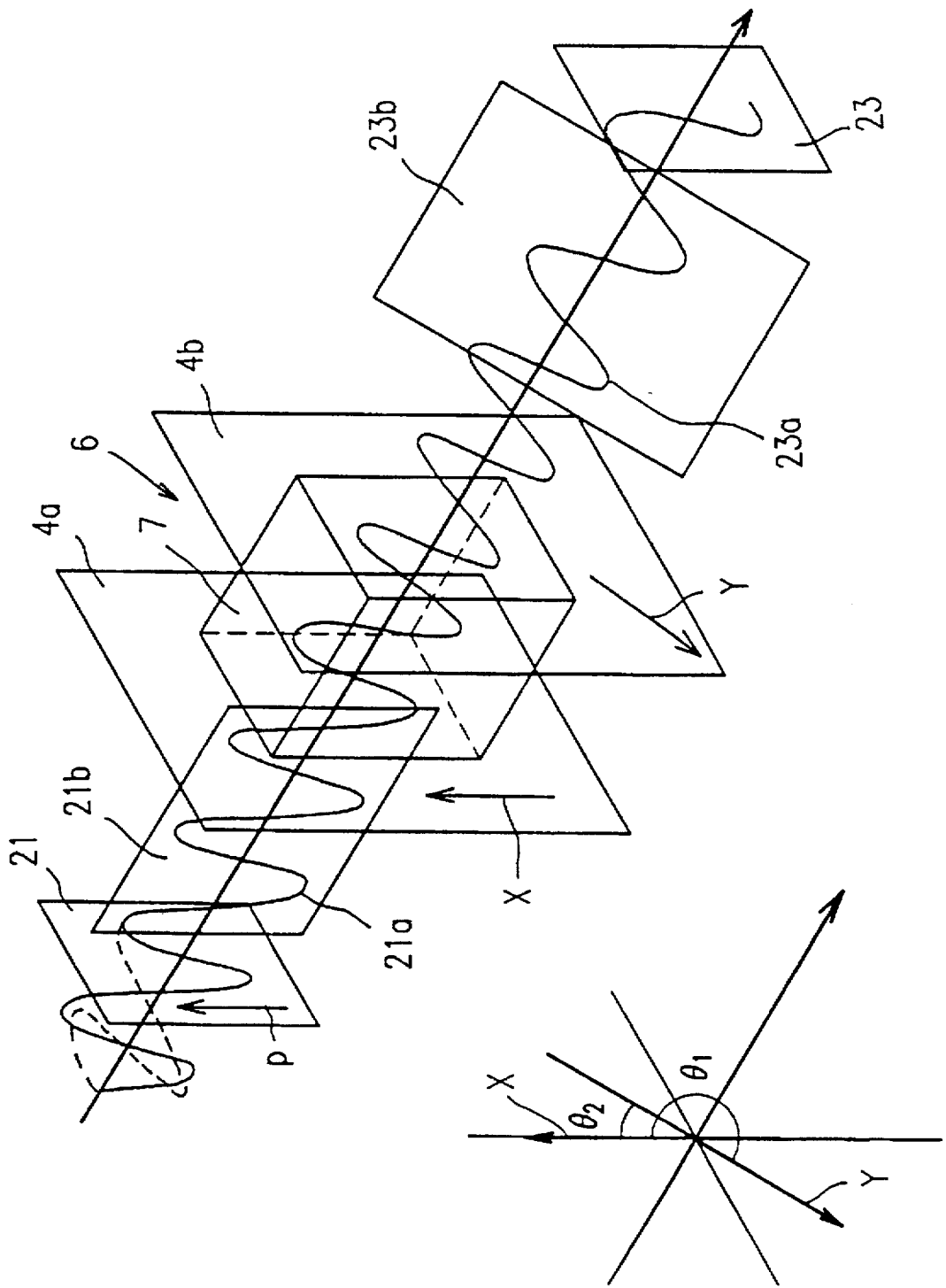
FIG. 10 is a schematic illustration showing that a polymeric wall made of rotatory polarization polymer twists a polarizing vibration plane.
Figure 11:
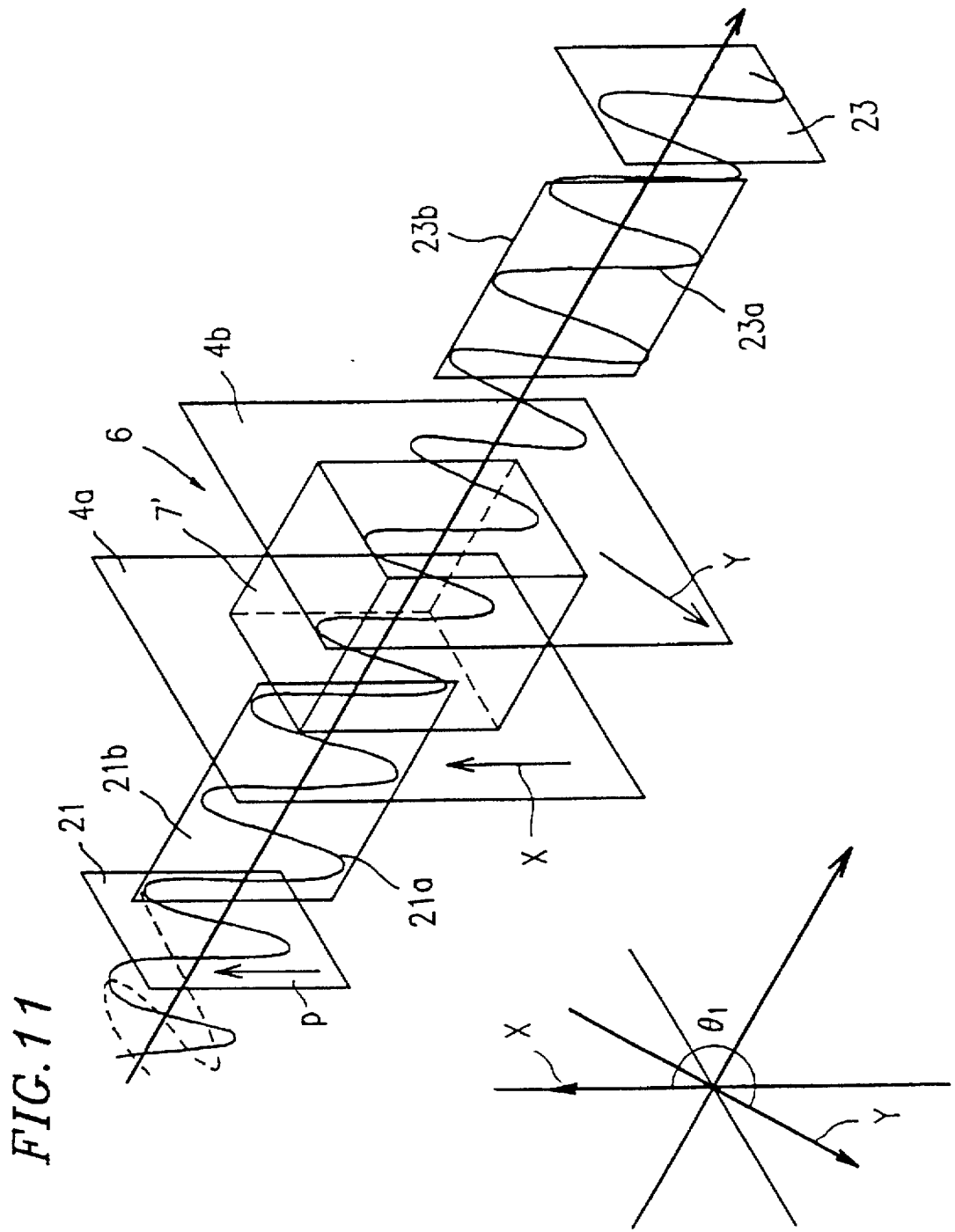
FIG. 11 is a schematic illustration showing that a polymeric wall made of isotropic polymer does not twist a polarizing vibration plane.

Next, the rotatory polarization of the polymeric wall (that is, the rotation of the polarizing vibration plane performed by the rotatory polarization polymer) will be described, referring to FIGS. 10 and 11. FIG. 10 is a schematic illustration showing that since the polymeric wall made of the rotatory polarization polymer rotates the polarizing vibration plane, a liquid crystal display device having high brightness can be obtained. FIG. 11 is a schematic illustration showing that since the polymeric wall made of the isotropic polymer does not rotate the polarizing vibration plane, a liquid crystal display device having high brightness cannot be obtained.

As shown in FIG. 10, alignment films 4a and 4b subjected to an alignment treatment are provided on the counter faces of a pair of substrates having a liquid crystal driving electrodes. Between the alignment films 4a and 4b, a polymeric wall 7 patterned in a predetermined pattern (for example, a pattern of lattice shape corresponding to the non-pixel portions), and a liquid crystal layer 6 surrounded by the polymeric wall 7, are formed. Moreover, polarizing plates 21 and 23 are provided to the outside of the substrates. The polymeric wall 7 is made of the rotatory polarization polymer. The polymeric wall 7 has a predetermined rotatory polarization corresponding to the alignment regulating force of the alignment films 4a and 4b regardless of the presence or absence of the voltage application to the electrodes. The rotatory polarization of the polymeric wall 7 is substantially equal to that of the liquid crystal layer 6.

With no voltage application, the liquid crystal molecules of the liquid crystal layer 6 are subjected to the alignment regulation of the alignment films 4a and 4b, so as to be aligned at a predetermined twist angle between the alignment films 4a and 4b. A circularly polarized light incident to the liquid crystal device is changed into a linearly polarized light by the polarizing plate 21. When the linearly polarized light passes through the liquid crystal layer 6, the polarizing vibration plane (an electric field vibration plane) thereof is twisted by the liquid crystal. Accordingly, the polarizing vibration plane of the linearly polarized light passing through the liquid crystal display device is continuously twisted between the polarizing plates 21 and 23. As a result, the liquid crystal display device presents a white display with no voltage application.

In the liquid crystal display device of the present invention, the polymeric wall 7 is constituted by the rotatory polarization polymer. The rotatory polarization polymer is obtained by polymerizing the rotatory polarization monomer under a state in which the alignment regulating portion of the rotatory polarization monomer is subjected to the alignment regulation of the alignment films 4a and 4b (that is, under a state in which the alignment regulating portion of the rotatory polarization monomer is aligned at a twist angle in a range of zero to π/2(rad) between the alignment films 4a and 4b). As a result, the rotatory polarization polymer of the polymeric wall 7 has a molecular structure in which the alignment regulating portion is aligned at a twist angle in a range of zero to π/2(rad) between the alignment films 4a and 4b (for example, a twisted ladder-shaped or comb-shaped molecular structure). Accordingly, in the liquid crystal display device of the present invention, when a linearly polarized light 21a passes through the polymeric wall 7 in the non-pixel portion, the polarizing vibration plane 21b thereof is twisted to be the polarizing vibration plane 23b as in the case of passing through the liquid crystal layer 6. For example, when the alignment treatment direction of the alignment film 4a at the incident side is set to X , the alignment treatment direction of the other alignment film 4b is set to Y, and the alignment treatment direction X and the alignment treatment direction Y is twisted at the angle $\theta_1$ from each other, the polarizing axis P of the polarizing plate 21 on the incident side is made to be parallel to the alignment treatment direction X of the alignment film 4a, so that the linearly polarized light 21a having the polarizing vibration plane 21b in a direction of the polarizing axis P is changed into the linearly polarized light 21b having the polarizing vibration plane 23b twisted at the angle $\theta_2$ ($\theta_1-\pi$)(rad). As described above, because the polymeric wall 7 has a rotatory. polarization (that is, the polarizing vibration plane of the linearly polarized light is rotated), coloring caused by the polymeric wall 7 is reduced. As a result, a liquid crystal device having a bright white-display with a small difference in the coloring between the pixel portions and non-pixel portions can be obtained. It is not required that the twist of the polarizing vibration plane of the liquid crystal layer 6 coincides with that of the polarizing vibration plane of the polymeric wall 7.

On the other hand, in the case of a polymeric wall 7' made of a conventional isotropic polymer (for example, PMMA), as shown in FIG. 11, the polarizing vibration plane of the incident linearly polarized light is not twisted. For example, when an alignment treatment direction of the alignment film 4a on the incident side is set to X, an alignment treatment direction of the other alignment film 4b is set to Y, the angle between the alignment treatment direction X and the alignment treatment direction Y is set to $\theta_1$, and the polarizing axis P of the polarizing plate 21 on the incident side and the alignment treatment direction X of the alignment film 4a are parallel to each other, the linearly polarized light 21a having the polarizing vibration plane 21b in a direction of the polarizing axis P comes to a linearly polarized light 23a having a polarizing vibration plane 23b in a direction identical to that of the polarizing vibration plane 21b, even after passing through the polymeric wall 7'. Accordingly, the difference of coloring between the pixel portion and the non-pixel portion is not cancelled, and only a liquid crystal display device having a dark display is obtained. For example, in the case of a liquid crystal display device in the STN mode, the coloring caused by the phase difference generated by the rotatory light of the liquid crystal is mainly compensated by the phase difference plate. However, in the case where the polymeric wall is isotropic, the polymeric wall is colored due to provision of the polarizing plate and the phase difference plate. In the case of the liquid crystal display device in the STN mode using no phase differential plate or the liquid crystal display device in the TN mode, the isotropic polymeric wall is colored in black or gray in accordance with the twisting angle of the polarizing plate.

Figure 12:
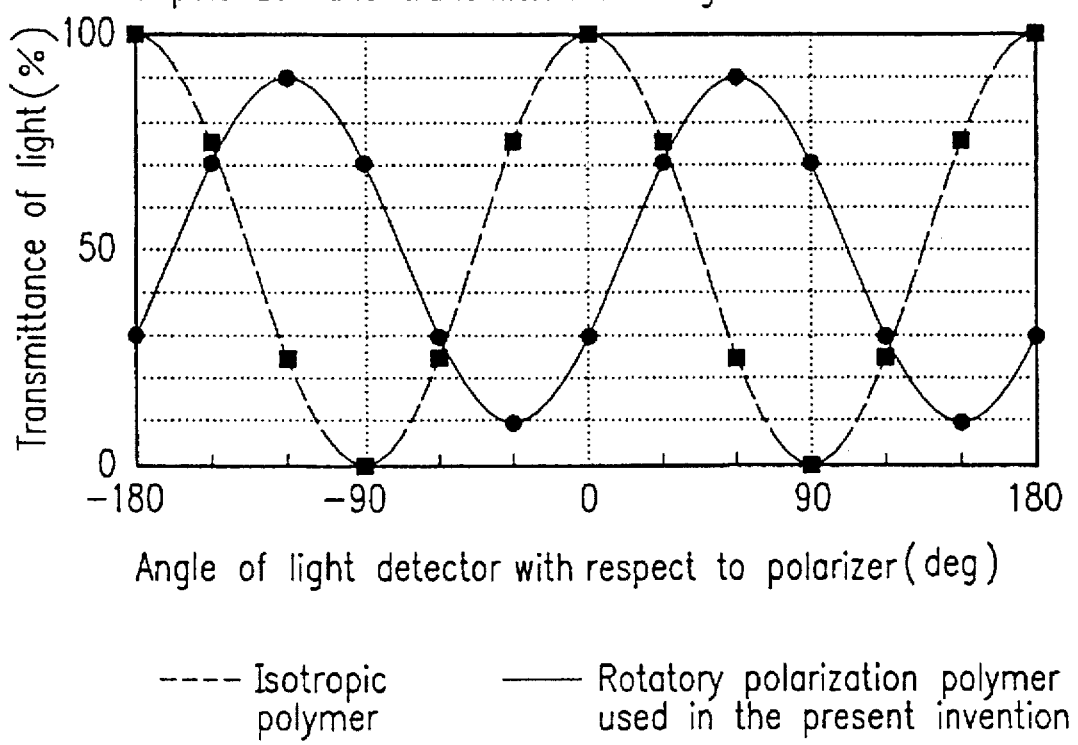
FIG. 12 is a graph for comparing a rotatory polarization polymer and an isotropic polymer with respect to the twist of a polarizing vibration plane, in other words, a graph showing the relationship between the rotation angle of the light detector with respect to the polarizer and the transmittance of light.

Hereinafter, the rotatory polarization polymer and the isotropic polymer will be further compared with each other with regard to the twist of the polarizing vibration plane, referring to FIG. 12. FIG. 12 is a graph showing the relationship between the angle of a light detector with respect to the polarizer (that is, the angle between the polarizing axis of the polarizing plate 21 and the polarizing axis of the polarizing plate 23 in FIGS. 10 and 11) and the transmittance of YAG laser second harmonics having a wavelength of 532 nm. The angle formed when the polarizing axis of the polarizing plate 21 and the polarizing axis of the polarizing plate 23 are parallel to each other is defined as zero degree. Furthermore, in FIG. 12, the curve shown in a solid line and black circles indicates the case of the rotatory polarization polymer used in the present invention, and the curve shown in a broken line and black squares indicates the case of PMMA which is a conventional isotropic polymer.

The rotatory polarization polymer shown by the solid line in FIG. 12 has the alignment regulating portion γ twisted by π/3(rad) by setting the angle between the alignment treatment direction of the alignment film 4a and the alignment treatment direction of the alignment film 4b to 4π/3(rad). As is apparent from FIG. 12, the polymeric wall made of such a rotatory polarization polymer has a maximum transmittance when the angle between the polarizing axis of the polarizing plate 21 and the polarizing axis of the polarizing plate 23 is π/3(rad). That is, FIG. 12 shows that the polymeric wall has the rotatory polarization of π/3(rad). In this case, the reason why the maximum transmittance is not 100% and the minimum transmittance is not 0% is that the orientation of the alignment regulating portion γ is locally disturbed.

On the other hand, in the case of PMMA which is an isotropic polymer shown by the broken line in FIG. 12, the polarizing vibration plane of the linearly polarized plane is not twisted. Accordingly, the transmittance is 0% in the crossnichol state (that is, when the polarizing axis of the polarizing plate 21 and the polarizing axis of the polarizing plate 23 intersect at right angles with each other). When the polarizing axis of the polarizing plate 21 and the polarizing axis of the polarizing plate 23 are parallel to each other, the transmittance is 100%. That is, in FIG. 12, the transmittance is 0% at 90 degrees (π/2(rad)) and −90 degrees (−π/2(rad)), and the transmittance is 100% at 0 degree. This means that PMMA is isotropic and has a rotatory polarization of 0.

According to the present invention, the polymeric wall 7 is made of the rotatory polarization polymer obtained from the polymerization of the rotatory polarization monomer. In addition, the polymeric wall 7 has a predetermined rotatory polarization polymerization corresponding to the alignment regulating force of the substrates regardless of the presence or absence of the voltage application. The rotatory polarization monomer has at least an alignment regulating portion and a polymerizable portion. The polymerizable portion is polymerized under a state in which the alignment regulating portion is subjected to the alignment regulation of a substrate (substantially an alignment film). Accordingly, the polymer can be obtained with the alignment regulating portion thereof aligned at the twist angle in a predetermined range in the direction of the thickness of the liquid crystal display device. Since the thus-obtained polymer has a rotatory polarization, the polymeric wall has the rotatory polarization. When the linearly polarized light incident to the liquid crystal display device via the polarizing plate passes through the polymeric wall, the polarizing vibration plane of the linearly polarized light is twisted by the polymeric wall, as in the case of passing through the liquid crystal layer. Accordingly, the coloring by the polymeric wall is reduced.

As a result, the entire liquid crystal display presents a bright display close to the paper-like display. The black level of the pixel portion based on the electric optical characteristics of the liquid crystal is constant, and does not depend on the background. Accordingly, the brighter background provides the improved apparent-contrast between the displayed image (for example, letters) and the background. As a result, an easy-on-the eyes liquid crystal display device which provides clearly displayed letters can be obtained. In particular, the effect is remarkable in a reflection type liquid crystal display device with a normally white display (a white display with no voltage application) for which brightness is the particularly important factor.

On the other hand, since the polymeric wall made of the isotropic polymer has no rotatory polarization, the polarizing vibration plane of the incident linearly polarized light is not twisted. As a result, the coloring difference between the pixel portion and the non-pixel portion is not cancelled. Therefore, it is impossible to obtain a liquid crystal display device with a bright display. In other words, the background of the liquid crystal display device is dark. As described above, the pixel portion has a constant black level. Therefore, if the background is dark, the apparent contrast between the displayed image (for example, letters) and the background is reduced, just as in the case where brighter paper (a paper having a higher white level) provides a clearer contrast in the written portions even if the black level of a pen used in writing is unchanged.

Figure 13A:
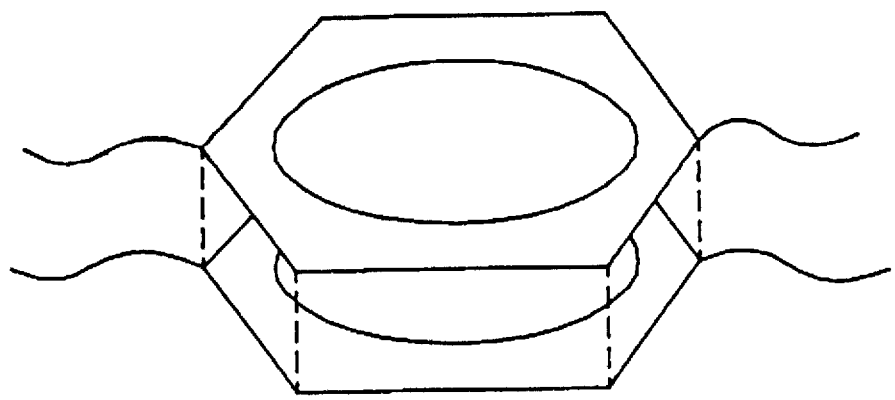
FIGS. 13A and 13B are schematic illustrations showing the advantages of the rotatory polarization monomer used in the present invention, from the viewpoint of the molecular interaction between the monomer and the material of the alignment film.
Figure 13B:
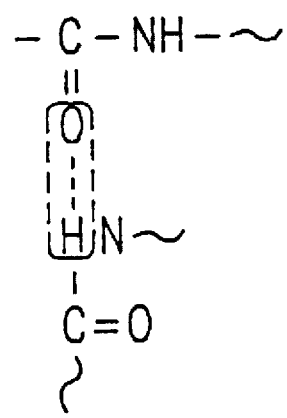

Moreover, a temperature at which the regulating portion of the rotatory polarization monomer is not subjected to the regulation of the alignment film is higher than the temperature at which the liquid crystal material shows the isotropy (that is, a phase transition temperature of the liquid crystal material). The reason is as follows: the alignment regulating portion of the rotatory polarization monomer has a chemical structure similar to the monomer unit of the polyimide resin (XXIX) and the polyamide resin (XXX) used for the alignment films 4a and 4b. Accordingly, the molecular interaction between the monomer unit of the alignment films 4a and 4b and the alignment regulating portion (for example, π electron interaction between phenyl groups shown in FIG. 13A; a hydrogen bonding between amide groups shown in FIG. 13B, and the like) is stronger than the interaction between the liquid crystal material and the monomer unit of the alignment films 4a and 4b. Accordingly, the alignment regulating portion of the rotatory polarization monomer is subjected to the regulation of the alignment films 4a and 4b even at a temperature at which the liquid crystal material exhibits isotropy.

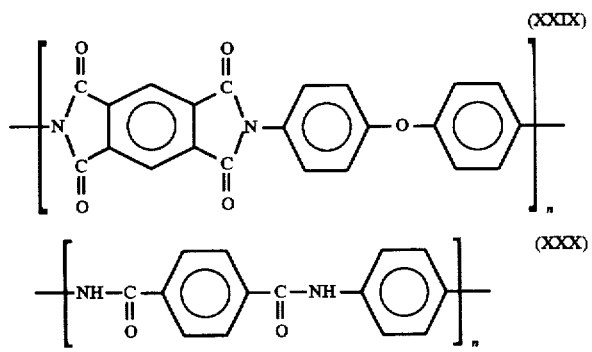

By irradiating a predetermined position with ultraviolet rays at the above-mentioned temperature, the polymerizable portion of the rotatory polarization monomer is additionpolymerized under the state in which the mobility of the molecules of the liquid crystal material and the rotatory polarization monomer is extremely large, as well as the state in which the alignment regulating portion of the rotatory polarization monomer is subjected to the alignment regulation of the alignment films. That is, the phase separation between the liquid crystal material and the rotatory polarization polymer made of the rotatory polarization monomer is achieved very easily. Moreover, the polymerizable portion is polymerized only in the portion irradiated with ultraviolet rays. Accordingly, the polymeric walls made of the rotatory polarization polymer are formed in the irradiated portion with ultraviolet rays, and the liquid crystal material gathers in the non-irradiated portion, so that the liquid crystal layer is formed. Typically, the irradiated portion is in a lattice shape corresponding to the non-pixel portion of the liquid crystal display device. Therefore, in the liquid crystal display device of the present invention, the liquid crystal is surrounded by the lattice-shaped polymeric wall as if cytoplasm of plant cells were surrounded by cell walls. In addition, the rotatory polarization polymer constituting the polymeric wall has a molecular structure (for example, a twisted ladder-shaped or a comb-shaped molecular structure) in which the alignment regulating portion is aligned at a twisted angle in a predetermined range (preferably, 0 to π/2 (rad)) between the alignment films. That is, the alignment is set at a predetermined twist angle. Accordingly, the obtained polymeric wall has a predetermined rotatory polarization. As a result, in the liquid crystal display device according to the present invention, the substrates are not deformed due to the input performed by the application of pressure with a pen, and the like. That is, the liquid crystal display device according to the present invention has a remarkably excellent resistance to pressure. In addition, the liquid crystal display device according to the present invention has a very bright display. Accordingly, in a liquid crystal display device with an input device integrated therewith or a liquid crystal display device with the input device directly installed thereon, the substrates are not deformed due to the input performed by the application of pressure with pen, and the like. As a result, there is no need to use a thick glass as in the case of conventional devices, and an easy-on-the-eyes liquid crystal display device with input functions and with less parallax can be obtained.

Furthermore, in the liquid crystal display device of the present invention, the main chains of the rotatory polarization polymer constituting the polymeric walls are bound to each other to form a three-dimensional network structure. Accordingly, the alignment of the alignment regulating portion in the rotatory polarization polymer is not disturbed by the application of the static electricity due to friction, and the like. As a result, the polymeric wall of the liquid crystal display device according to the present invention has a constant rotatory polarization in the entire polymeric walls (that is, non-pixel portions), and no partial coloring is generated.

Moreover, according to the present invention, there is no need for the materials used for forming the polymeric walls to contain the monomers having chiral functional groups. In fact, in one embodiment, the liquid crystal display device of the present invention contains polymeric walls made of monomers which do not contain chiral functional groups. Accordingly, it is possible to reduce the kinds of the monomers to be used, resulting in advantage in terms of cost.

A liquid crystal display device of the present invention is preferably used for portable information terminals such as personal computers, word processors, electronic organizers, and the like; and a display such as an electronic desk calculator, especially, a display of portable information terminals capable of directly inputting information on the screen.

EXAMPLES

Hereinafter, the present invention will be described by way of illustrative examples. However, the present invention is not limited to these examples.

Example 1

A pair of substrates was used (in this example, glass substrates). On the glass substrates, an ITO film having a thickness of 2000 Å was formed by sputtering, and then, the ITO film was processed by photolithography, so that stripe-shaped pixel electrodes having a width of 300 μm and intervals of 20 μm therebetween were formed. Next, an electrical insulating film made of $SiO_2$ was formed to have a thickness of 500 Å by sputtering so as to cover the pixel electrodes. Then, alignment films made of polyimide resin were formed to have a thickness of 700 Å by flexography. The orientation films were subjected to alignment treatment in such a manner that when the substrates were attached to each other so that the respective pixel electrodes intersected at right angles with each other, the alignment regulating direction of the alignment films was $4\pi/3$(rad) in a clockwise direction. The substrates having the pixel electrodes, the electrical insulating film, and the alignment films formed thereon were attached to each other via a spacer having a diameter of 5 μm in such a manner that the respective pixel electrodes intersected at right angle with each other. Between the attached substrates, a mixture of the liquid crystal material (RDP-157; fabricated by Rodeck) and a rotatory polarization monomer represented by Formula (XXII) at a ratio of 87.1:12.9 (weight ratio) was injected. Then, the periphery of the substrates were sealed by sealant. As a result, a liquid crystal cell was obtained.

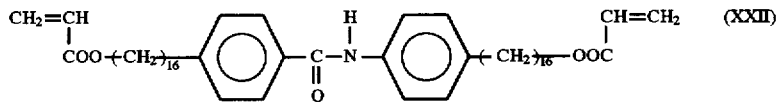

Next, the liquid crystal cell was irradiated with ultraviolet light through a photomask having a light blocking portion corresponding to the pixel portions with an intensity of 40 mW/cm$^2$ for 60 seconds, under the state in which the liquid crystal cell was heated at 90° C. Then, the liquid crystal cell was cooled to room temperature (approximately 25° C.) at a cooling rate of 0.1° C./minutes. After that, the liquid crystal cell was irradiated with ultraviolet light at intensity of 50 mW/cm$^2$ for 60 seconds. As a result, a liquid crystal layer and polymeric walls surrounding the liquid crystal layer were formed. Finally, a polarizing plate and a reflector were disposed on the outside of the liquid crystal cell, and a phase difference plate and a polarizing plate were disposed on the other outside of the liquid crystal cell. As a result, a reflection type liquid crystal display device in STN mode having a normally white display was obtained.

The thus-obtained liquid crystal display device included polymeric walls having a rotatory polarization of $\pi/3$(rad). The polymeric walls allowed light for transmitting therethrough as well as the liquid crystal layer. As a result, the liquid crystal display device had a remarkably bright display. Moreover, the liquid crystal display device had a liquid crystal surrounded by the lattice-shaped polymeric walls, as if cytoplasm of plant cells was surrounded by cell walls. Accordingly, the substrates of the liquid crystal device were not deformed by the input performed by application of pressure with pen, and the like, and exhibited a remarkably excellent resistance to pressure.

Example 2

A liquid crystal display device having an input function was fabricated in the same manner as described in Example 1, except that a pressure-sensing type input device having transparent electrodes was provided between a substrate and a phase difference plate. The brightness, resistance to pressure, and parallax of the liquid crystal display device were examined. As a result, the thus-obtained liquid crystal display device had a very bright display and an excellent resistance to pressure. Moreover, the liquid crystal was an easy-on-the eyes device, having an input function and less parallax.

Example 3

A liquid crystal display device was fabricated in the same manner as described in Example 1, except that alignment films were subjected to alignment treatment in such a manner that the alignment regulating direction of the alignment films was $13\pi/9$(rad) in a clockwise direction when substrates were attached to each other so that the respective pixel electrodes intersected at right angles with each other. The thus-obtained liquid crystal display device included polymeric walls having a rotatory polarization of $4\pi/9$(rad). The polymeric walls allowed light for transmitting therethrough as well as the liquid crystal layer. As a result, the liquid crystal display device had a remarkably bright display. Moreover, the liquid crystal display device had a liquid crystal surrounded by the lattice-shaped polymeric walls. Accordingly, the substrates of the liquid crystal device were not deformed by the input performed by application of pressure with pen, and the like, and exhibited a remarkably excellent resistance to pressure.

Example 4

A liquid crystal display device having an input function was fabricated in the same manner as described in Example 3, except that a pressure-sensing type input device having transparent electrodes was provided between a substrate and a phase difference plate. The brightness, resistance to pressure, and parallax of the liquid crystal display device were examined. As a result, the thus-obtained liquid crystal display device had a very bright display and an excellent resistance to pressure. Moreover, the liquid crystal was an easy-on-the eyes device, having an input function and less parallax.

Example 5

A liquid crystal display device was fabricated in the same manner as described in Example 1, except that alignment films were subjected to alignment treatment in such a manner that the alignment regulating direction of the alignment films was $\pi/2$(rad) in a clockwise direction when substrates were attached to each other so that the respective pixel electrodes intersected at right angles with each other. The thus-obtained liquid crystal display device included polymeric walls having a rotatory polarization of π/2(rad). The polymeric walls allowed a light for transmitting therethrough as well as the liquid crystal layer. As a result, the liquid crystal display device had a remarkably bright display. Moreover, the liquid crystal display device had a liquid crystal surrounded by the lattice-shaped polymeric walls. Accordingly, the substrates of the liquid crystal device were not deformed by the input performed by application of pressure with pen, and the like, and exhibited a remarkably excellent resistance to pressure.

Example 6

A liquid crystal display device having an input function was fabricated in the same manner as described in Example 5, except that a pressure-sensing type input device having transparent electrodes was provided between a substrate and a phase difference plate. The brightness, resistance to pressure, and parallax of the liquid crystal display device were examined. As a result, the thus-obtained liquid crystal display device had a very bright display and an excellent resistance to pressure. Moreover, the liquid crystal was an easy-on-the eyes device, having an input function and less parallax.

Example 7

A liquid crystal display device was fabricated in the same manner as described in Example 1, except that a rotatory polarization monomer ($T_{pi}$=120° C.) represented by Formula (XXIII) was used:

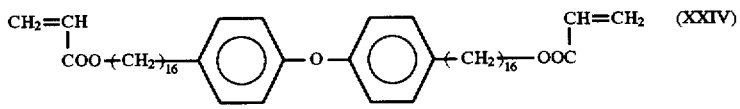

The thus-obtained liquid crystal display device included polymeric walls having a rotatory polarization of π/2(rad). The polymeric walls allowed light for transmitting therethrough as well as the liquid crystal layer. As a result, the liquid crystal display device had a remarkably bright display. Moreover, the liquid crystal display device had a liquid crystal surrounded by the lattice-shaped polymeric walls. Accordingly, the substrates of the liquid crystal device were not deformed by the input performed by application of pressure with pen, and the like, and exhibited a remarkably excellent resistance to pressure.

Example 8

A liquid crystal display device having an input function was fabricated in the same manner as described in Example 7, except that a pressure-sensing type input device having transparent electrodes was provided between a substrate and a phase difference plate. The brightness, resistance to pressure, and parallax of the liquid crystal display device were examined. As a result, the thus-obtained liquid crystal display device had a very bright display and an excellent resistance to pressure. Moreover, the liquid crystal was an easy-on-the eyes device, having an input function and less parallax.

Example 9

A liquid crystal display device was fabricated in the same manner as described in Example 1, except that a rotatory polarization monomer ($T_{pi}$=110° C.) represented by Formula (XXIV) was used:

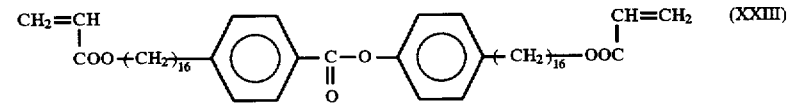

The thus-obtained liquid crystal display device included polymeric walls having a rotatory polarization of π/2(rad). The polymeric walls allowed light for transmitting therethrough as well as the liquid crystal layer. As a result, the liquid crystal display device had a remarkably bright display. Moreover, the liquid crystal display device had a liquid crystal surrounded by the lattice-shaped polymeric walls. Accordingly, the substrates of the liquid crystal device were not deformed by the input performed by application of pressure with pen, and the like, and exhibited a remarkably excellent resistance to pressure.

Example 10

A liquid crystal display device having an input function was fabricated in the same manner as described in Example 9, except that a pressure-sensing type input device having transparent electrodes was provided between a substrate and a phase difference plate. The brightness, resistance to pressure, and parallax of the liquid crystal display device were examined. As a result, the thus-obtained liquid crystal display device had a very bright display and an excellent resistance to pressure. Moreover, the liquid crystal was an easy-on-the eyes device, having an input function and less parallax.

Example 11

A liquid crystal display device was fabricated in the same manner as described in Example 1, except that a rotatory polarization monomer represented by Formula (XXV) was used:

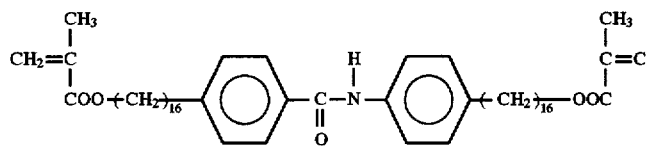 (XXV)

The thus-obtained liquid crystal display device included polymeric walls having a rotatory polarization of π/2(rad). The polymeric walls allowed light for transmitting therethrough as well as the liquid crystal layer. As a result, the liquid crystal display device has a remarkably bright display. Moreover, the liquid crystal display device had a liquid crystal surrounded by the lattice-shaped polymeric walls. Accordingly, the substrates of the liquid crystal device were not deformed by the input performed by application of pressure with pen, and the like, and exhibited a remarkably excellent resistance to pressure.

Example 12

A liquid crystal display device having an input function was fabricated in the same manner as described in Example 11, except that a pressure-sensing type input device having transparent electrodes was provided between a substrate and a phase difference plate. The brightness, resistance to pressure, and parallax of the liquid crystal display device were examined. As a result, the thus-obtained liquid crystal display device had a very bright display and an excellent resistance to pressure. Moreover, the liquid crystal was an easy-on-the eyes device, having an input function and less parallax.

Example 13

A liquid crystal display device was fabricated in the same manner as described in Example 1, except that a rotatory polarization monomer represented by Formula (XXVI) was used:

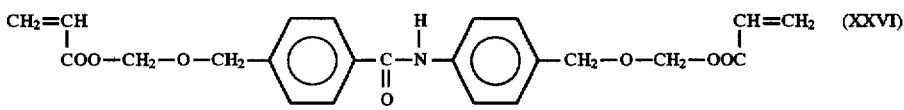

The thus-obtained liquid crystal display device included polymeric walls having a rotatory polarization of π/2(rad). The polymeric walls allowed light for transmitting therethrough as well as the liquid crystal layer. As a result, the liquid crystal display device had a remarkably bright display. Moreover, the liquid crystal display device had a liquid crystal surrounded by the lattice-shaped polymeric walls. Accordingly, the substrates of the liquid crystal device were not deformed by the input performed by application of pressure with pen, and the like, and exhibited a remarkably excellent resistance to pressure.

Example 14

A liquid crystal display device having an input function was fabricated in the same manner as described in Example 13, except that a pressure-sensing type input device having transparent electrodes was provided between a substrate and a phase difference plate. The brightness, resistance to pressure, and parallax of the liquid crystal display device were examined. As a result, the thus-obtained liquid crystal display device had a very bright display and an excellent resistance to pressure. Moreover, the liquid crystal was an easy-on-the eyes device, having an input function and less parallax.

Example 15

A liquid crystal display device was fabricated in the same manner as described in Example 1, except that a rotatory polarization monomer ($T_{pi}=100$) represented by Formula (XXVII) was used:

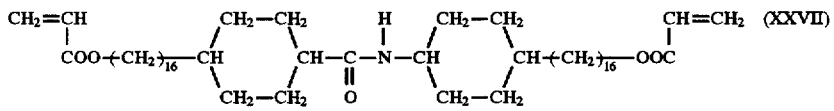

The thus-obtained liquid crystal display device included polymeric walls having a rotatory polarization of π/2(rad). The polymeric walls allowed light for transmitting therethrough as well as the liquid crystal layer. As a result, the liquid crystal display device had a remarkably bright display. Moreover, the liquid crystal display device had a liquid crystal surrounded by the lattice-shaped polymeric walls. Accordingly, the substrates of the liquid crystal device were not deformed by the input performed by application of pressure with pen, and the like, and exhibited a remarkably excellent resistance to pressure.

Example 16

A liquid crystal display device having an input function was fabricated in the same manner as described in Example 15, except that a pressure-sensing type input device having transparent electrodes was provided between a substrate and a phase difference plate. The brightness, resistance to pressure, and parallax of the liquid crystal display device were examined. As a result, the thus-obtained liquid crystal display device had a very bright display and an excellent resistance to pressure. Moreover, the liquid crystal was an easy-on-the eyes device, having an input function and less parallax.

Example 17

A liquid crystal display device was fabricated in the same manner as described in Example 1, except that a rotatory polarization monomer ($T_{pi}$=105° C.) represented by Formula (XXVIII) was used:

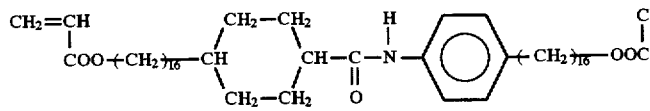

The thus-obtained liquid crystal display device included polymeric walls having a rotatory polarization of π/2(rad). The polymeric walls allowed light for transmitting therethrough as well as the liquid crystal layer. As a result, the liquid crystal display device had a remarkably bright display. Moreover, the liquid crystal display device had a liquid crystal surrounded by the lattice-shaped polymeric walls. Accordingly, the substrates of the liquid crystal device were not deformed by the input performed by application of pressure with pen, and the like, and exhibited a remarkably excellent resistance to pressure.

Example 18

A liquid crystal display device having an input function was fabricated in the same manner as described in Example 17, except that a pressure-sensing type input device having transparent electrodes was provided between a substrate and a phase difference plate. The brightness, resistance to pressure, and parallax of the liquid crystal display device were examined. As a result, the thus-obtained liquid crystal display device had a very bright display and an excellent resistance to pressure. Moreover, the liquid crystal was an easy-on-the eyes device, having an input function and less parallax.

As is apparent from these examples, according to the present invention, a liquid crystal display device having a bright display, an excellent resistance to pressure, and less parallax is provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising a pair of substrates opposed to each other, polymeric walls patterned in a predetermined pattern, and a liquid crystal layer at least a part of which is surrounded by the polymeric walls, the polymeric walls and the liquid crystal layer being interposed between the substrates, wherein the polymeric walls have a predetermined rotatory polarization corresponding to an alignment regulating force of the substrates, and
wherein a rotatory polarization monomer forming the polymeric walls comprises an alignment regulating portion and a polymerizable portion located on at least one end of the alignment regulating portion.

2. A liquid crystal display device according to claim 1, wherein a compound forming the alignment regulating portion is at least one of the compounds selected from the group consisting of cyclopentane, cyclohexane, pyrrole, pyridine, benzene, biphenyl, terphenyl, phenylcyclohexane, anilide benzoate, N-cyclohexylbenzoamide, N-chclohexyl cyclohexanecarboxamide, phenyl benzoate, and phenyl ether.

3. A liquid crystal display device according to claim 1, wherein the polymerizable portion is selected from the group consisting of a vinyl group, a methacrylic group, and an acrylic group.

4. A liquid crystal display device according to claim 1, wherein a compound forming the alignment regulating portion is at least one of the compounds selected from the group consisting of cyclopentane, cyclohexane, pyrrole, pyridine, benzene, biphenyl, terphenyl, phenylcyclohexane, anilide benzoate, N-cyclohexylbenzoamide, N-cyclohexylcyclohexane, phenyl benzoate, and phenyl ether; and the polymerizable portion is selected from the group consisting of a vinyl group, a methacrylic group, and an acrylic group.

5. A liquid crystal display device according to claim 1, wherein the rotatory polarization monomer further comprises a spacer portion between the alignment regulating portion and the polymerizable portion.

6. A liquid crystal display device according to claim 1, wherein a mixture of a liquid crystal material forming the liquid crystal layer and the rotatory polarization monomer has a content of the liquid crystal material equal to an opening ratio of the liquid crystal display device.

7. A liquid crystal display device according to claim 1, wherein a rotatory polarization of the polymeric walls is larger than zero and is equal to or smaller than π/2(rad).

8. A liquid crystal display device according to claim 1, further comprising a pressure-sensing type input device.

9. A method for fabricating a liquid crystal display device comprising a pair of substrates opposed to each other, polymeric walls patterned in a predetermined pattern, and a liquid crystal layer at least a part of which is surrounded by the polymeric walls, the polymeric walls and the liquid crystal layer being interposed between the substrates, the method comprising the steps of:
injecting a mixture of a rotatory polarization monomer forming polymeric walls and a liquid crystal material forming a liquid crystal layer between the attached substrates so as to obtain a liquid crystal cell; and
selectively irradiating a predetermined portion of the liquid crystal cell with ultraviolet rays at a temperature at which the liquid crystal material exhibits an isotropic phase and an alignment regulating portion of the rotatory polarization monomer is subjected to an alignment regulation of the substrate, thereby polymerizing the rotatory polarization monomer in the predetermined portion so as to form the polymeric walls, and to form a liquid crystal layer in a non-irradiated portion.

10. A method for fabricating a liquid crystal display device according to claim 9, wherein the irradiated portion corresponds to the non-pixel portion.

11. A method for fabricating a liquid crystal display device according to claim 9, wherein the means for selectively irradiating ultraviolet rays is a method using a photomask.

12. A method for fabricating a liquid crystal display device according to claim 9, wherein the means for selectively irradiating ultraviolet rays is a self-alignment method.

13. A method for fabricating a liquid crystal display device according to claim 9, further comprising the steps of cooling the liquid crystal cell to room temperature after irradiation and irradiating the liquid crystal cell again with ultraviolet rays at room temperature.

* * * * *